US010386928B2

(12) United States Patent
Israr et al.

(10) Patent No.: US 10,386,928 B2
(45) Date of Patent: Aug. 20, 2019

(54) DYNAMIC HAPTIC EFFECTS GENERATOR

(71) Applicant: Disney Enterprises. Inc., Burbank, CA (US)

(72) Inventors: Ali Israr, Monroeville, PA (US); Nobuhisa Hanamitsu, Kanagawa (JP); Zachary T. Schwemler, Philadelphia, PA (US); Zachary T. Batts, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/486,092

(22) Filed: Apr. 12, 2017

(65) Prior Publication Data

US 2018/0299957 A1    Oct. 18, 2018

(51) Int. Cl.
*G06F 3/01* (2006.01)
*G06T 19/00* (2011.01)

(52) U.S. Cl.
CPC .................................. *G06F 3/016* (2013.01)

(58) Field of Classification Search
None
See application file for complete search history.

(56) References Cited

U.S. PATENT DOCUMENTS

| | | | | |
|---|---|---|---|---|
| 2011/0239383 | A1* | 10/2011 | Nishiura | A61C 17/3445 15/22.1 |
| 2014/0265650 | A1* | 9/2014 | Jeon | H02K 33/16 310/25 |
| 2016/0094115 | A1* | 3/2016 | Okawa | A61C 17/3445 310/25 |
| 2016/0258758 | A1* | 9/2016 | Houston | G01C 21/20 |
| 2017/0070131 | A1* | 3/2017 | Degner | H02K 33/16 |

OTHER PUBLICATIONS

Israr, Ali, et al. "Po2: Augmented Haptics for Interactive Gameplay." *ACM SIGGRAPH 2015 Emerging Technologies*, Aug. 2015, Los Angeles, California. p. 1.
Israr, Ali, et al. "Stereohaptics; A Haptic Interaction Toolkit for Tangible Virtual Experiences." *ACM SIGGRAPH 2016 Studio*, New York, New York. 2016 p. 57.
Brisben A. J., et al. "Detection of Vibration Transmitted Through an Object Grasped in the Hand." J. Neurophysiol. 81, 1999. pp. 1548-1558.

* cited by examiner

*Primary Examiner* — Benjamin C Lee
*Assistant Examiner* — Krishna P Neupane
(74) *Attorney, Agent, or Firm* — Farjami & Farjami LLP

(57) ABSTRACT

A haptic effects generator includes a circuit configured to generate a drive signal, and a haptic actuator coupled to the circuit. The haptic actuator includes a casing having first and second axial ends, a coil configured to receive the drive signal from the circuit and situated within the casing, and a mass designed to move between the first and second axial ends in response to a magnetic field generated by the coil. The haptic actuator also includes a first spring configured to damp the movement by the mass, situated between the mass and the first axial end of the casing, and a second spring configured to damp the movement by the mass, situated between the mass and the second axial end of the casing. The haptic effects generator can cause the mass to oscillate in a range of frequencies.

20 Claims, 5 Drawing Sheets

DYNAMIC HAPTIC EFFECTS GENERATOR

BACKGROUND

Virtual reality (VR) experiences, such as single and multi-player VR games, merge computer generated imagery with real physical actions in a way that provides a deeply immersive and stimulating sensory experience to a user. Many VR systems utilize a head-mounted display (HMD) in combination with a hand-tracking controller that tracks user actions, gestures, and motion in the VR environment. Moreover, such hand tracking controllers may also be used to provide tactile sensations, in the form of haptic feedback, coupled with the audiovisual content presented via the HMD.

However, one limitation associated with present VR systems is the relatively primitive nature of the conventional haptic actuators available for use in providing haptic feedback. For example, due to the low-fidelity nature of conventional haptic actuators, the haptic feedback they provide is typically limited to homogenous buzzing type vibrations. Consequently there is a need in the art for a haptic actuator capable of producing a broader range of haptic effects in order to enhance users' VR experiences.

SUMMARY

There are provided dynamic haptic effects generators and methods for their use, substantially as shown in and/or described in connection with at least one of the figures, and as set forth more completely in the claims.

DETAILED DESCRIPTION

Figure 1:
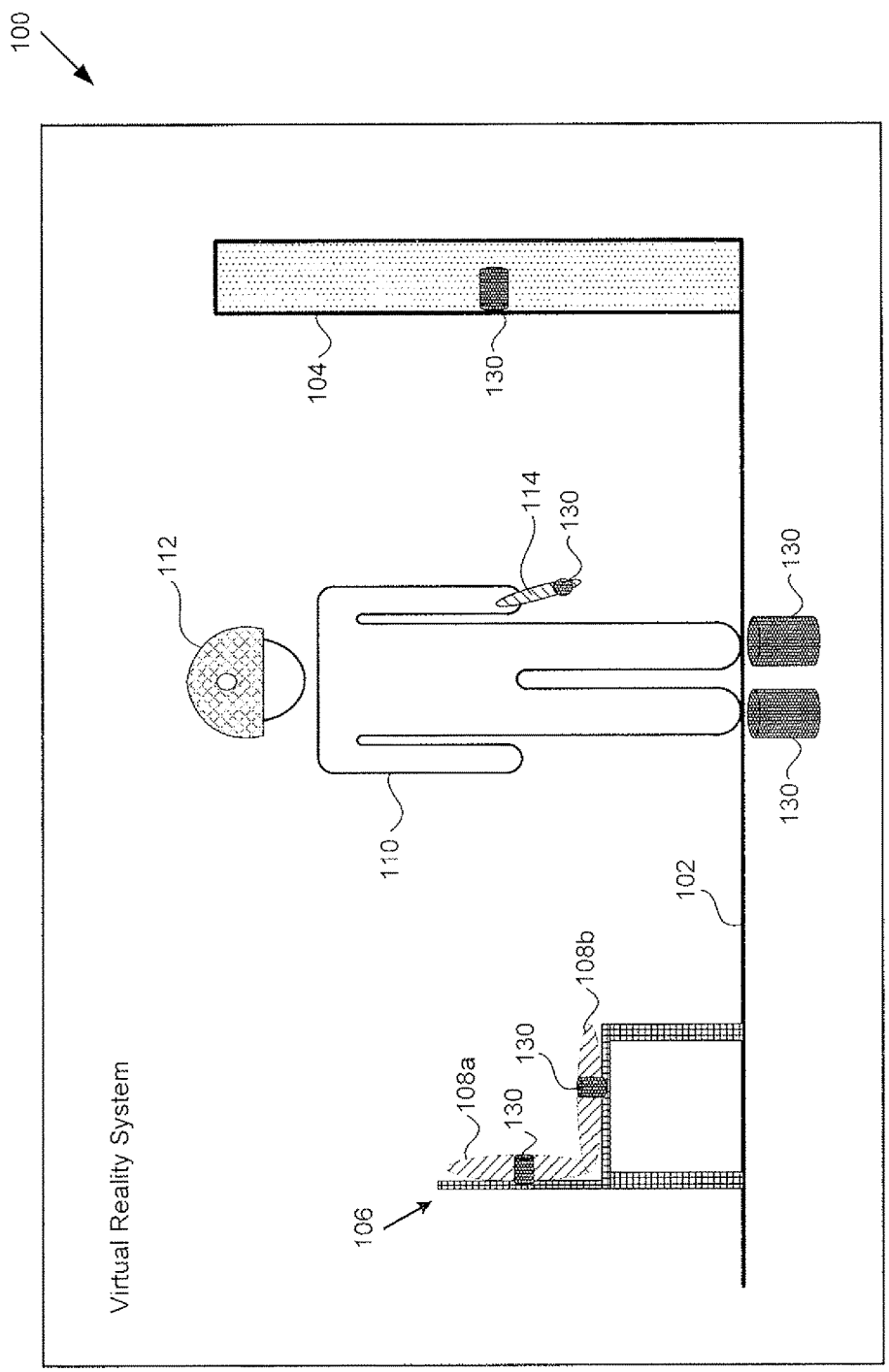
FIG. 1 shows a diagram of a virtual reality (VR) system including exemplary haptic actuators in a variety of implementational settings.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

As stated above, virtual reality (VR) experiences, such as single and multi-player VR games, merge computer generated imagery with real physical actions in a way that provides a deeply immersive and stimulating sensory experience to a user. Many VR systems utilize a head-mounted display (HMD) in combination with a hand-tracking controller that tracks user actions, gestures, and motion in the VR environment. Moreover, such hand tracking controllers may also be used to provide tactile sensations, in the form of haptic feedback, coupled with the audiovisual content presented via the HMD.

However, and as also stated above, one limitation associated with present VR systems is the relatively primitive nature of the conventional haptic actuators available for use in providing haptic feedback. For example, due to the low-fidelity nature of conventional haptic actuators, the haptic feedback they provide is typically limited to homogenous buzzing type vibrations. Consequently there is a need in the art for a haptic actuator capable of producing a broader range of haptic effects in order to enhance users' VR experiences.

The present application discloses a dynamic haptic effects generator that utilizes an inertial haptic actuator capable of rendering haptic effects across substantially the entire range of frequencies perceivable by a human user. Such a haptic actuator includes a casing containing a mass situated between springs. The mass is designed to move between opposite axial ends of the casing in response to a magnetic field generated by a coil also contained by the casing. The disclosed haptic actuator can be used to produce high-frequency vibrations, mid-frequency flutter sensations, and low-frequency motional cues. As a result, a single haptic actuator can advantageously be utilized to extend the haptic effects experienced by a user to include directional, vibrational, resistive, and textural feedback.

FIG. 1 shows a diagram of VR system 100 including exemplary haptic actuators 130 in a variety of implementational settings. As shown in FIG. 1, VR system 100 is being utilized by user 110 wearing HMD 112 and carrying handheld device 114, which may be a hand tracking controller, for example. As further shown in FIG. 1, in addition to haptic actuators 130, VR system 100 includes floor surface 102 upon which user 110 is standing, wall surface 104, and seat or chair 106 having seating surfaces 108*a* and 108*b*.

According to the exemplary implementation shown in FIG. 1, haptic actuators 130 may have differing sizes and may implemented so as to have differing orientations. For example, one or more of haptic actuators 130 may be implemented in handheld device 114. Alternatively, or in addition, haptic actuators 130 may be implemented in seating surfaces 108*a* and/or 108*b*. As another alternative, or in addition to one or both of the previously described implementations, one or more larger haptic actuators 130 may be implemented in wall surface 104. As yet another alternative, or in addition to one, some, or all of the previously described implementations, one or more still larger haptic actuators 130 may be implemented in floor surface 102.

In some implementations, as shown in FIG. 1, haptic actuators 130 may be oriented such that the haptic effects they produce are applied substantially perpendicular to the surfaces or objects in which they are situated. Thus, haptic actuators 130 may produce any of motional effects including non-vibrational pulling and/or pushing effects, flutter effects, and/or vibrational effects that are perceived by user 110 to be produced by handheld device 114, seating surfaces 108*a* and/or 108*b*, and/or wall surface 104, and/or floor surface 102. The haptic effects produced by any or all of haptic actuators 130, in combination with audiovisual content presented via HMD 112, can advantageously generate an immersive and pleasing VR experience for user 110.

Figure 2:
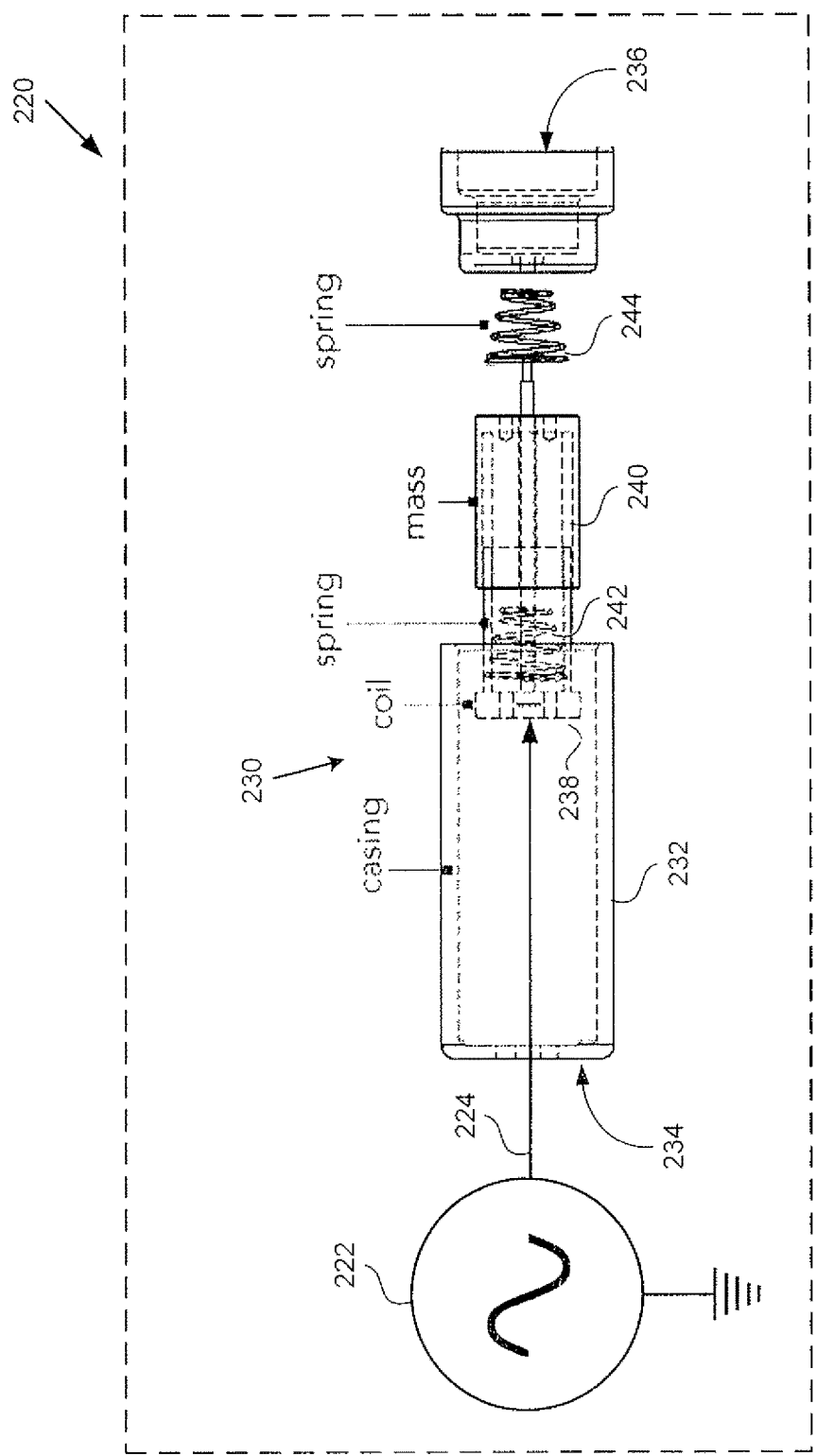
FIG. 2 is a diagram showing an exemplary representation of a dynamic haptic effects generator including an exploded view of any of the haptic actuators shown in FIG. 1, according to one implementation.

FIG. 2 is a diagram showing an exemplary representation of dynamic haptic effects generator 220 including an exploded view of any of haptic actuators 130 shown in FIG. 1, according to one implementation. As shown in FIG. 2, dynamic haptic effects generator 220 includes circuit 222 generating drive signal 224, and haptic actuator 230 coupled to circuit 222. As further shown in FIG. 2, haptic actuator 230 includes casing 232 having first axial end 234 and second axial end 236 opposite first axial end 234. In addition, haptic actuator 230 includes coil 238, mass 240, and first and second springs 242 and 244 contained within casing 232.

Haptic actuator 230 corresponds in general to any or all of haptic actuators 130, in FIG. 1, and those corresponding features may share the characteristics attributed to any corresponding feature by the present disclosure. That is to say, like haptic actuator 230, in FIG. 2, each of haptic actuators 130, in FIG. 1, may include a casing 232 having first and second axial ends 234 and 236, and containing coil 238, mass 240, and first and second springs 242 and 244.

It is noted that, although not explicitly shown in FIG. 1, haptic actuators 130 may be coupled to one or more circuits corresponding in general to circuit 222, in FIG. 2. Thus, in some implementations, circuit 222 may be coupled to a single haptic actuator 130/230, as shown in FIG. 2. However, in other implementations, circuit 222 may be coupled to and configured to generate one or more drive signals 224 for driving more than one of haptic actuators 130, either selectively, or substantially concurrently.

Casing 232 having first and second axial ends 234 and 236 may be a mechanically rigid casing, for example. As a specific example, casing 232 may be produced using a three-dimensional (3D) printer. Coil 238, which may be a voice coil, for example, is situated within casing 232 adjacent first axial end 234, and is configured to receive drive signal 224 from circuit 222. Mass 240 may be a magnet, for example, that can be caused to move between first axial end 234 and second axial end 236 of casing 232 in response to a magnetic field generated by coil 238 when coil 238 receives drive signal 224 from circuit 222.

First spring 242 is situated between mass 240 and first axial end 234 of casing 232, and damps the movement by mass 240 between first axial end 234 and second axial end 236. Second spring 244, which may have substantially the same or a significantly different spring constant than that of first spring 242, is situated between mass 240 and second axial end 236 of casing 232. Second spring 244 also damps the movement by mass 240 between first axial end 234 and second axial end 236.

The interaction of coil 238 receiving drive signal 224, mass 240, and first and second springs 242 and 244 causes mass 240 to oscillate within casing 232 in a range of frequencies that can include frequencies corresponding to some or substantially all of the dynamic range of human perception, for example. In other words, dynamic haptic effects generator 220 can cause mass 240 to oscillate in such a range of frequencies. For example, in some implementations, the range of frequencies through which mass 240 may be caused to oscillate may range from less than ten hertz (10 Hz), such as approximately 2 Hz, for example, to approximately 200 Hz, 300 Hz, or even 500 Hz.

Figure 3:
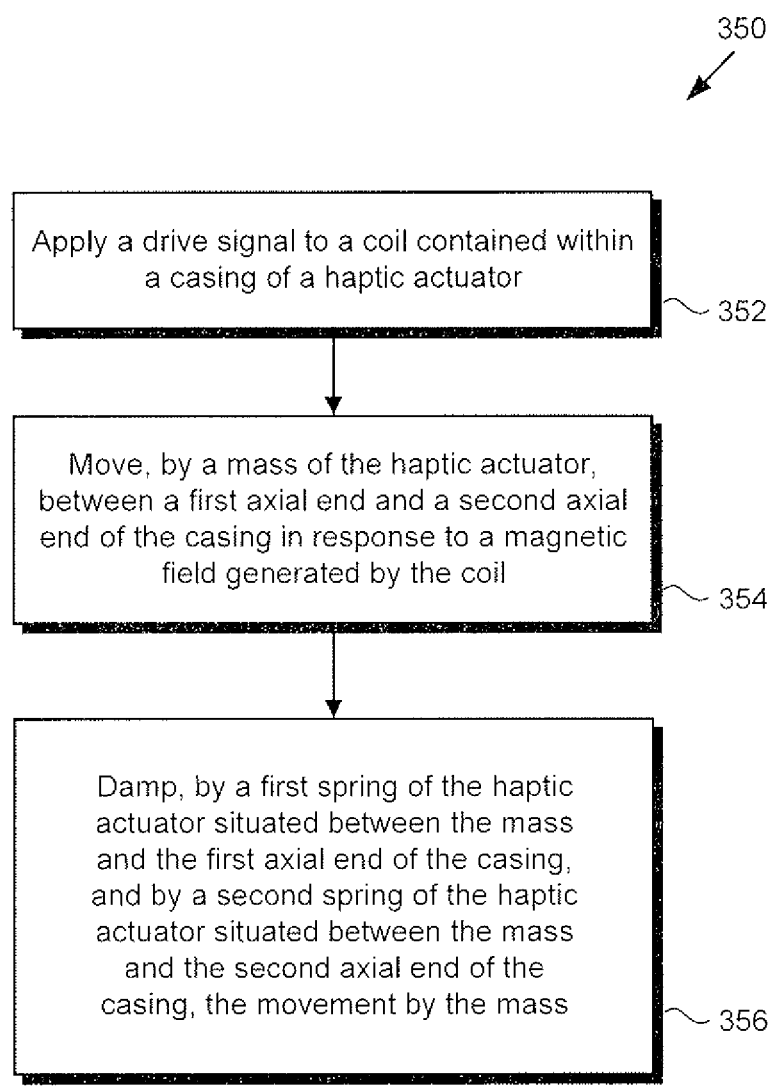
FIG. 3 shows a flowchart presenting an exemplary method for use by a dynamic haptic effects generator, according to one implementation.

The features shown in FIGS. 1 and 2 of the present application will be further described by reference to FIGS. 3 and 4. FIG. 3 presents flowchart 350 outlining an exemplary method for use by dynamic haptic effects generator 220, while FIG. 4 shows diagram 400 including several exemplary haptic effects produced by dynamic haptic effects generator 220, and their corresponding drive signals 424a, 424b, 424c, and 424d, according to various implementations.

It is noted that drive signals 424a, 424b, 424c, and 424d correspond in general to drive signal 224, in FIG. 2, and those corresponding features may share the characteristics attributed to any corresponding feature by the present disclosure. It is further noted that user 410, in FIG. 4, corresponds to user 110, in FIG. 1. With respect to the method outlined in FIG. 3, it is noted that certain details and features have been left out of flowchart 350 in order not to obscure the discussion of the inventive features in the present application.

Figure 4:
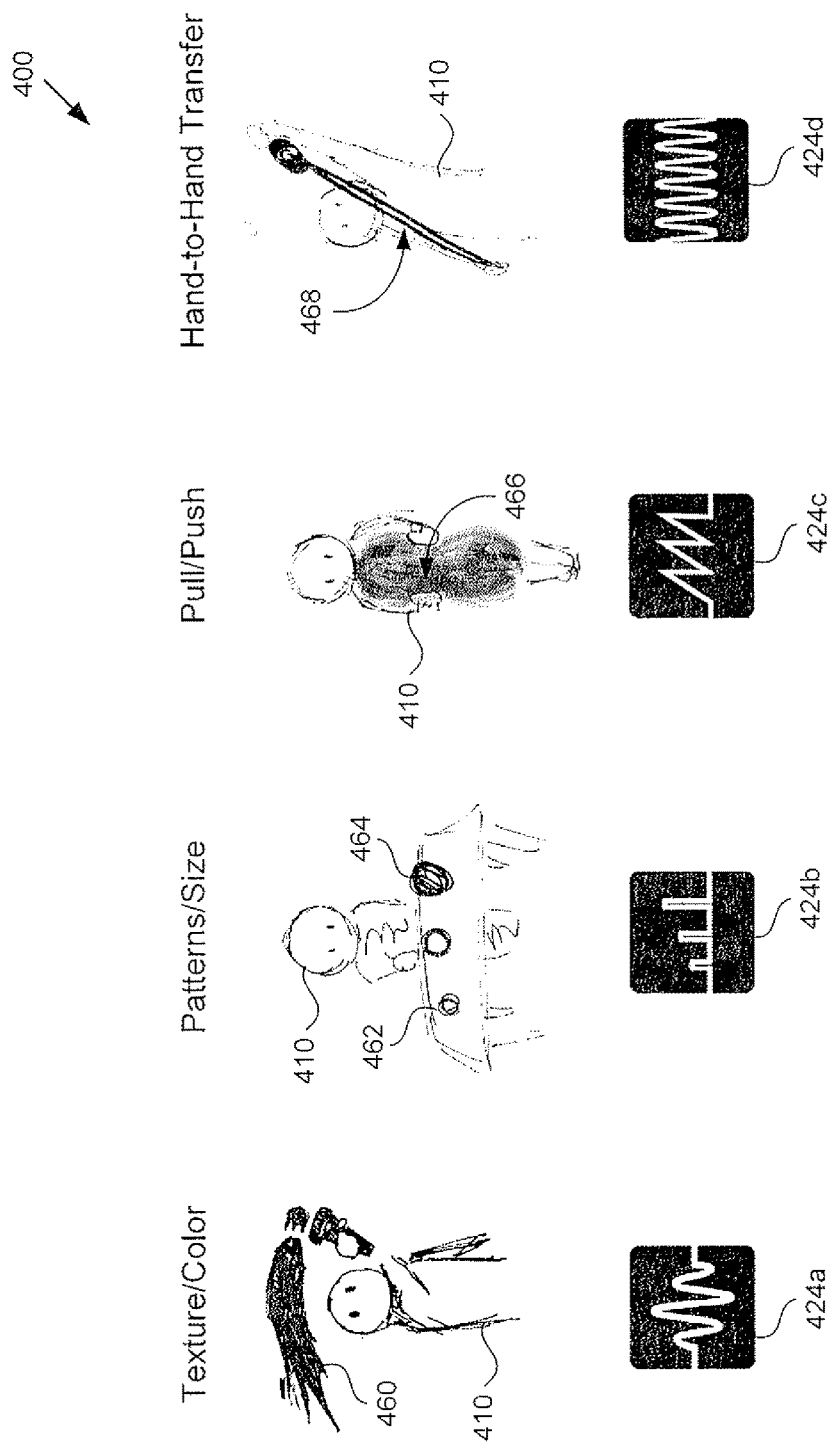
FIG. 4 shows a diagram including several exemplary haptic effects produced by a dynamic haptic effects generator and their corresponding drive signals, according to various implementations.

Referring to FIG. 3 in combination with FIGS. 1, 2, and 4, flowchart 350 begins with applying drive signal 224/424a/424b/424c/424d to coil 238 contained within casing 232 of haptic actuator 130/230 (action 352). As shown in FIG. 4, drive signal 224/424a/424b/424c/424d may be applied to coil 238 in a number of different signal formats. For example, in one implementation, drive signal 224/424a may be applied as a discrete wave packet or packets.

Alternatively, or in addition, drive signal 224/424b may be applied as a series of discrete pulses. As another alternative, or in addition to one or both of the previously described drive signal waveforms, drive signal 224/424c may be applied as a sawtooth signal. As yet another alternative, or in addition to one, some, or all of the previously described drive signal waveforms, drive signal 224/424d may be applied as a high frequency sinusoidal signal. As shown by FIG. 2, dynamic haptic effects generator 220 may utilize circuit 222 to apply drive signal 224/424a/424b/424c/424d to coil 238.

Referring to FIG. 3 in combination with FIGS. 1 and 2, flowchart 350 continues with moving, by mass 240, between first axial end 234 and second axial end 236 of casing 232 in response to a magnetic field generated by coil 238 (action 354). As noted above, in some implementations, coil 238 may be a voice coil. Moreover, in some implementations, the combination of circuit 222, coil 238, and mass 240 may implement a linear voice coil motor (LVCM), in which voice coil 238 is driven by circuit 222 to generate a varying magnetic field. That varying magnetic field causes mass 240 to move between first axial end 234 and second axial end 236 of casing 232.

Flowchart 350 can conclude with damping, by first spring 242 of haptic actuator 130/230 situated between mass 240 and first axial end 234 of casing 232, and by second spring 244 of haptic actuator 130/230 situated between mass 240 and second axial end 236 of casing 232, the movement by mass 240 (action 356).

It is noted that the initial direction of motion of mass 240 will depend on the shape of drive signal 224/424a/424b/424c/424d as it is first applied to coil 238. In some instances, for example, mass 240 may be initially caused to move away from first axial end 234 of casing 232 and toward second axial end 236. In those cases, first spring 242 will initially be stretched and second spring 244 will initially be compressed from their respective equilibrium lengths. According to Hooke's law, first spring 242 will exert a force on mass 240 that is proportional to the spring constant ($k_1$) of first spring 242 and has a direction opposing the stretching of first spring 242, i.e., a force applied against the direction of motion of mass 240. Analogously, and also according to Hooke's law, second spring 244 will exert a force on mass 240 that is proportional to the spring constant ($k_2$) of second spring 244 and has a direction opposing the compression of second spring 244, i.e., another force applied against the direction of motion of mass 240.

In other instances, mass 240 may be initially caused to move toward first axial end 234 of casing 232 and away from second axial end 236. In those cases, first spring 242 will initially be compressed and second spring 244 will initially be stretched from their respective equilibrium lengths. According to Hooke's law, first spring 242 will exert a force on mass 240 that is proportional to $k_1$ and has a direction opposing the compression of first spring 242, i.e., a force applied against the direction of motion of mass 240. Analogously, and again according to Hooke's law second spring 244 will exert a force on mass 240 that is proportional to $k_2$ and has a direction opposing the stretching of second spring 244, i.e., another force applied against the direction of motion of mass 240.

As noted above, in some implementations, $k_1$ and $k_2$ may be substantially the same, while in other implementations, $k_1$ and $k_2$ may be significantly different. Depending upon the inertial mass of mass 240, the values of $k_1$ and $k_2$, and the character of drive signal 224/424a/424b/424c/424d, mass 240 may be caused to oscillate in a range frequencies. In one implementation, for instance, the range of frequencies in which mass 240 may be caused to oscillate may include substantially the entire range of frequencies perceivable by a human user. For example, mass 240 may be caused to oscillate in a range frequencies from approximately 2 Hz, for example, to approximately 200 Hz, 300 Hz, or even 500 Hz.

Due to the range of frequencies in which dynamic haptic effects generator 220 can cause mass 240 to oscillate, a wide variety of haptic effects can be produced using haptic actuator 130/230. For example, haptic actuator 130/230 can be used to produce high-frequency vibrations, mid-frequency, e.g., less than or approximately equal to 80 Hz flutter sensations, and low-frequency motional cues. As a result, haptic actuator to 130/230 can extend the haptic effects experienced by user 110/410 to include directional, vibrational, resistive, and textural feedback.

As specific examples, dynamic haptic effects generator 220 may utilize haptic actuator 130/230 to produce a haptic effect as one or more of a non-vibratory pulling force and a non-vibratory pushing force. Alternatively, or in addition, dynamic haptic effects generator 220 may utilize haptic actuator 130/230 to produce a haptic effect as one or more of an apparent surface texture, an apparent color, an apparent elasticity of an object, an apparent size of an object, and an apparent weight of an object.

Referring again to diagram 400, in FIG. 4, drive signal 124/424a can be applied to render a variety of surface textures or colors. As one specific example, haptic actuator 130/230 can render surface textures by periodically switching drive signal 124/424a on and off and/or modulating the perceived intensity of stimulations. Consequently, a VR experience can be produced that includes multiple touch surfaces for user 110/410 to interact with. For instance, dark and light stripes can be associated with respective OFF and ON states of the stimulations provided using haptic actuator 130/230. By varying hand movements and the spatial layout of the stripes, user 110/410 can feel varying feedback caused by rapid transitions of drive signal 124/424a.

As another example, user 110/410 can produce colored strokes 460. The vibration frequency and amplitude of drive signal 124/424a can correspond to the Hue, Chroma, and Lightness of colored strokes 460 using a vibration to color mapping based on the CIELAB color model, for example.

Alternatively, drive signal 124/424b can be applied to render a variety of object interactions, as shown by the interaction of user 110/410 with objects including objects 462 and 464. In one case, for instance, user 110/410 can handle and drag objects 462 and 464. A "snap" action is highlighted by a brief pulse pushing or pulling a hand of user 110/410, and drag forces are represented by vibration amplitude coupled to the hand motion. Heavier and larger objects, such as object 464, render high resistance and therefore a higher amplitude of drive signal 124/424b, whereas, lighter objects render low resistance and therefore a lower amplitude of drive signal 124/424b.

As another alternative, drive signal 124/424c can be applied to generate a variety of pulling and/or pushing sensations 466 applied to user 110/410. Referring back to FIG. 1, haptic actuators 130/230 are implemented in various surfaces with which user 110/410 interacts, e.g., floor surface 102, wall surface 104, and seating surfaces 108a and 108b. Those haptic actuators 130/230 can generate pulling and/or pushing sensations on various portions of the body of user 110/410. Forceful pulling and/or pushing can correspond to a higher amplitude of drive signal 124/424c, while weaker, less forceful, pulling and/or pushing correspond to a lower amplitude of drive signal 124/424c.

As yet another haptic effect, drive signal 124/424d can be applied to generate a variety of illusory movements of an object with which user 110/410 interacts. For example, user 110/410 may perceive that an object held in one hand transfers through illusory movement 468 to the other hand of the user. In one such implementation, for example, drive signal 124/424d may cause the object to appear to move rapidly from hand-to-hand. However, in another implementation, drive signal 124/424d may cause the object to appear to move more slowly, such as to float, from hand-to-hand.

It is noted that, in some implementations, the frequency response of haptic actuator 130/230 can be tuned based on a frequency function. That is to say, the inertial mass of mass 240, and spring constants $k_1$ and $k_2$ of respective first and second springs 242 and 244 can be selected so that the range of frequencies through which mass 240 can be caused to oscillate substantially matches the frequencies of the frequency function.

Figure 5:
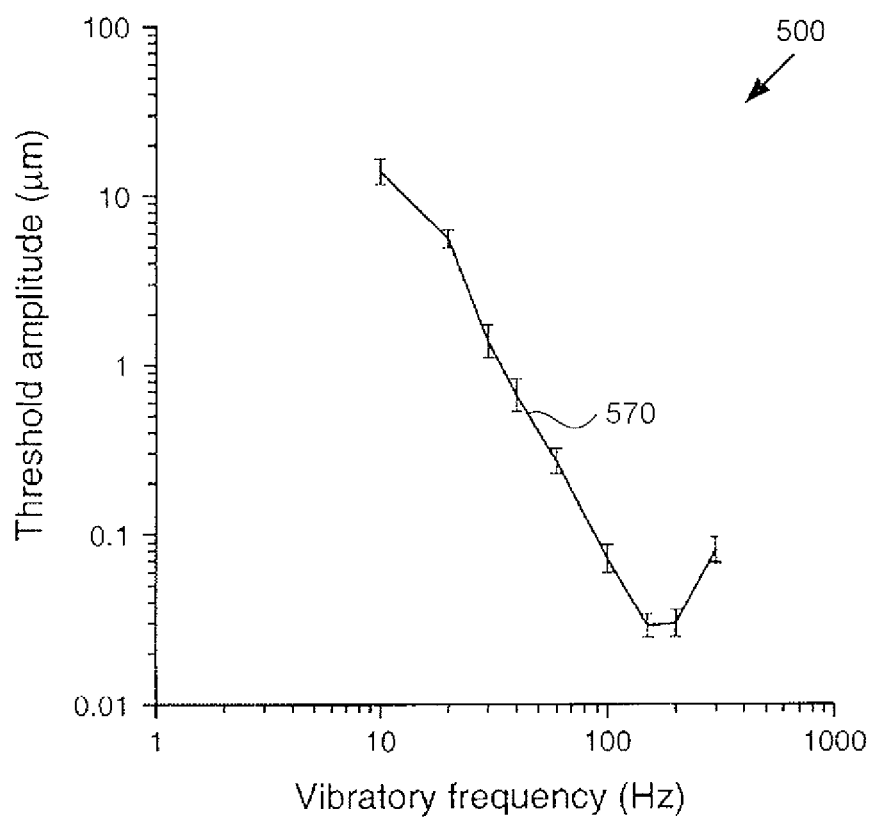
FIG. 5 presents a graph showing human perception of vibration as a function of vibratory frequency.

FIG. 5 presents graph 500 showing human perception of vibration as a function of vibratory frequency, as human sensitivity curve 570. Graph 500 and human sensitivity curve 570 were generated by A. J. Brisben, S. S. Hsiao, and K. O. Johnson based on their original research and published as: "Detection of vibration transmitted through an object grasped in the hand." *Journal of Neurophysiology* 81.4. pp 1548-1558. (1999). As defined for the purposes of the present application, any reference to a "human sensitivity curve" or a "frequency function corresponding to a human sensitivity curve" refers specifically to the data shown by graph 500.

In some implementations, a frequency function to which haptic actuator 130/230 is tuned may correspond to human sensitivity curve 570. Thus, the inertial mass of mass 240, and spring constants $k_1$ and $k_2$ of respective first and second springs 242 and 244 may be selected so that the range of frequencies through which mass 240 can be caused to oscillate substantially matches the frequencies of human sensitivity to curve 570. As a result, in those implementations, haptic actuator 130/230 is naturally optimized in the dynamic range of frequencies perceivable by a human user.

Thus, the present application discloses a dynamic haptic effects generator that utilizes an inertial haptic actuator capable of rendering haptic effects across substantially the entire range of frequencies perceivable by a human user. As described above, such a haptic actuator includes a casing containing a mass situated between springs. The mass is designed to move between opposite axial ends of the casing in response to a magnetic field generated by a coil also contained by the casing. The disclosed haptic actuator can be used to produce high-frequency vibrations, mid-frequency flutter sensations, and low-frequency motional cues. As a result, a single haptic actuator can advantageously be utilized to extend the haptic effects experienced by a user to include directional, vibrational, resistive, and textural feedback.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A haptic effects generator comprising:
   a circuit configured to generate a drive signal;
   a haptic actuator coupled to the circuit, the haptic actuator including:
     a casing having a first axial end and a second axial end;
     a coil configured to receive the drive signal from the circuit and situated within the casing adjacent the first axial end;
     a mass designed to have a movement between the first axial end and the second axial end in response to a magnetic field generated by the coil;
     a first spring configured to damp the movement of the mass, the first spring being situated between the mass and the coil; and
     a second spring configured to damp the movement of the mass, the second spring being situated between the mass and the second axial end of the casing;
   wherein the haptic effects generator is configured to cause the mass to oscillate in a range of frequencies.

2. The haptic effects generator of claim 1, wherein the range of frequencies is between approximately two hertz (2 Hz) and approximately five hundred hertz (500 Hz).

3. The haptic effects generator of claim 1, wherein a frequency response of the haptic actuator is tuned based on a frequency function, and the range of frequencies substantially matches frequencies of the frequency function.

4. The haptic effects generator of claim 3, wherein the frequency function corresponds to a human sensitivity curve.

5. The haptic effects generator of claim 1, wherein a first spring constant of the first spring and a second spring constant of the second spring are different.

6. The haptic effects generator of claim 1, wherein the coil comprises a voice coil.

7. The haptic effects generator of claim 1, wherein the haptic actuator is implemented in one of a handheld device, a wall surface, a seating surface, and a floor surface.

8. The haptic effects generator of claim 1, wherein a haptic effect produced by the haptic actuator comprises at least one of a non-vibratory pulling force and a non-vibratory pushing force.

9. The haptic effects generator of claim 1, wherein the haptic actuator is implemented in a virtual reality system.

10. The haptic effects generator of claim 9, wherein a haptic effect produced by the haptic actuator comprises at least one of an apparent surface texture, an apparent color, an apparent elasticity of an object, an apparent size of an object, and an apparent weight of an object.

11. A method for use by a haptic effects generator including a haptic actuator coupled to a circuit, the method comprising:
    applying, by the circuit, a drive signal to a coil contained within a casing of the haptic actuator adjacent the first axial end;
    causing a movement of a mass of the haptic actuator between a first axial end and a second axial end of the casing in response to a magnetic field generated by the coil; and
    damping the movement of the mass by a first spring of the haptic actuator situated between the mass and the coil, and by a second spring of the haptic actuator situated between the mass and the second axial end of the casing;
    wherein the mass oscillates in a range of frequencies.

12. The method of claim 11, wherein the range of frequencies is between approximately two hertz (2 Hz) and approximately five hundred hertz (500 Hz).

13. The method of claim 11, wherein a frequency response of the haptic actuator is tuned based on a frequency function, and the range of frequencies substantially matches frequencies of the frequency function.

14. The method of claim 13, wherein the frequency function corresponds to a human sensitivity curve.

15. The method of claim 11, wherein a first spring constant of the first spring and a second spring constant of the second spring are different.

16. The method of claim 11, wherein the coil comprises a voice coil.

17. The method of claim 11, wherein the haptic actuator is implemented in one of a handheld device, a wall surface, a seating surface, and a floor surface.

18. The method of claim 11, wherein a haptic effect produced by the haptic actuator comprises at least one of a non-vibratory pulling force and a non-vibratory pushing force.

19. The method of claim 11, wherein the haptic actuator is implemented in a virtual reality system.

20. The method of claim 19, wherein a haptic effect produced by the haptic actuator comprises at least one of an apparent surface texture, an apparent color, an apparent elasticity of an object, an apparent size of an object, and an apparent weight of an object.

* * * * *